United States Patent [19]

von Bergen

[11] 4,448,425
[45] May 15, 1984

[54] SHAFT SEAL ASSEMBLY WITH INFLATABLE ANNULAR MEMBER

[75] Inventor: Ernst P. von Bergen, Hamburg, Fed. Rep. of Germany

[73] Assignee: Howaldtswerke-Deutsche Werft Aktiengesellschaft Hamburg und Kiel, Fed. Rep. of Germany

[21] Appl. No.: 438,307

[22] Filed: Nov. 1, 1982

[30] Foreign Application Priority Data

Nov. 5, 1981 [DE] Fed. Rep. of Germany ....... 3143866

[51] Int. Cl.³ .......................... F16J 15/32; F16J 15/54
[52] U.S. Cl. ......................................... 277/34; 277/59; 277/153; 277/199; 277/2
[58] Field of Search ............... 277/34, 2, 34.3, 34.6, 277/59, 70, 71, 72 R, 72 FM, 152, 153, 192, 199, 226

[56] References Cited

U.S. PATENT DOCUMENTS

| 2,850,311 | 9/1958 | Mansfield | 277/199 X |
| 3,121,570 | 2/1964 | Gibert | 277/34.3 |
| 3,726,531 | 4/1973 | Pagan et al. | 277/59 |
| 3,847,453 | 11/1974 | Herbert | 277/59 X |
| 4,114,058 | 9/1978 | Albaric | 310/54 |
| 4,174,672 | 11/1979 | Cox | 277/59 X |

FOREIGN PATENT DOCUMENTS

| 1808970 | 8/1969 | Fed. Rep. of Germany . |
| 15570 | 6/1976 | Fed. Rep. of Germany ..... 277/34.3 |
| 2918418 | 11/1980 | Fed. Rep. of Germany . |

*Primary Examiner*—Robert S. Ward
*Attorney, Agent, or Firm*—Jon M. Lewis

[57] ABSTRACT

An annular seal assembly disposed between a shaft surface and a surrounding housing, for example, a seal assembly for an aft-stern tube seal of a sea-going vessel, comprises a nonrotating annular seal element having a circumferentially segmented construction, the segments having overlapping ends. An inflatable annular member, concentrically disposed between the housing and the seal element, sealingly supports the seal element on the shaft surface at the same time providing some freedom for radial vibrating movements to accommodate shaft-eccentricities and radial vibrating movements of the shaft. The seal assembly includes means to admit a controlled pressurized fluid into the inflatable member. The pressurized fluid may be the outboard sea water or any water or air under pressure. The pressurized fluid is so controlled as to maintain a narrow clearance between the shaft surface and the segmented seal element for a lubricant, regardless of seal wear and variation in the pressure head of the fluid. The segmented seal construction offers better performance over conventional non-segmented types.

12 Claims, 8 Drawing Figures

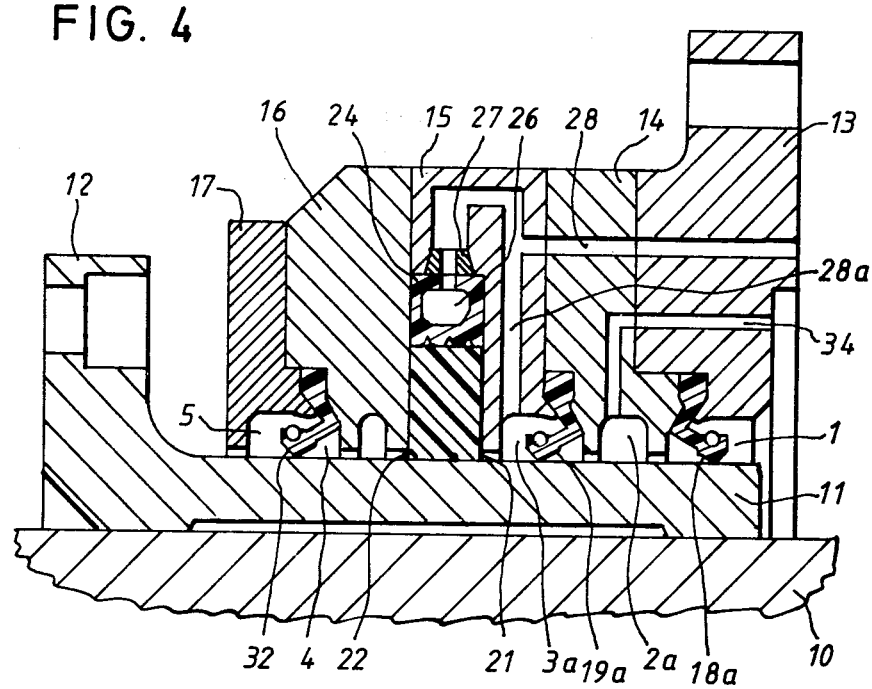
FIG. 4
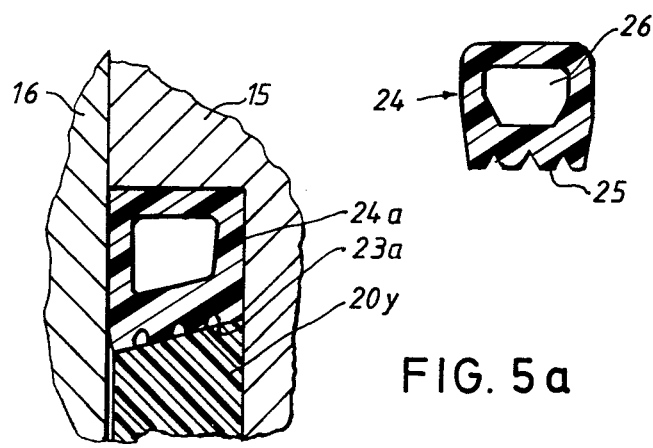
FIG. 5
FIG. 5a

SHAFT SEAL ASSEMBLY WITH INFLATABLE ANNULAR MEMBER

BACKGROUND OF THE INVENTION

The invention relates to improvements in shaft seal assemblies in which a segmental seal ring is radially compressed to seal against a rotating shaft or against a bush mounted on a rotating shaft, and wherein the segmental seal ring is a radial contact seal positioned in a housing as a dynamic seal between peripherical faces. The invention is applicable particularly to aft-stern tube seals of vessels.

DESCRIPTION OF PRIOR ART

Segmental seal rings are known in the art. Usually they are kept together by an endless spring placed around the segments. The radial compressive force of such a spring is low and is not adjustable in use; besides, the spring is subjected to corrosion and it is not reliable when used in a stern tube seal. Further there are known segmented contact seals used as low speed seals for a turbine rotor shaft wherein segments are activated and deactivated by pistons depending e.g. from the speed of the rotor. In German patent application No. 29 18 414 a radial contact seal is described which can be constrained against a bush by circumferentially drawing together a metal sleeve by mechanical means. This proposition requires a deformable material for a sealing face and, the metal parts are subjected to corrosion. In the same publication, for an axially sealing radial face seal it was proposed to support an axially movable slide ring by a flexible inflated member to compensate for axial movements of the shaft.

Known prior art arrangements have had the further disadvantage in that the segments of a radial contact seal were not uniformly and controllably compressable to maintain a small clearance for lubricating the sealing peripherical faces.

In U.S. Pat. No. 4,114,058, a water cooled turbine generator rotor is sealed by a gland seal arrangement during high speed operation and by a contact seal during low rotor speed and at standstill. The contact seal comprises segments and means such as a piston disposed within a cylinder and a spring to move the segments radially. The contact seal is activated and deactivated by control means according to rotor speed, or by responce to leakage flow when it reaches a predetermined threshold.

In such seal arrangement however, the contact seal is either completely opened or closed. There is no possibility to adjust the contact seal to a certain clearance. Means for operating the contact seal are complicated and, additionally, no compensation of radial movements of the shaft will be possible.

In German publication DE No. 29 18 418, a circumferential sealing element having one slit is mechanically compressed by a sleeve surrounding said element. It is taught to constrain the sealing element responsive to the leakage flow. Though this sealing arrangement was intended for stern tube seals, it was found that corrosion of the metal parts such as the sleeve and means for constraining the sleeve occurred, and that no suitable wear-resistant and deformable material for the sealing element was available, and that the circumferential clearance was not uniform.

German publication DE No. 18 08 970 teaches an axially sealing radial face seal in which a slide ring, which is axially moveable, is axially supported by an inflated tube, wherein axial movements, such as because of wear, can be compensated. The axial force of the inflated tube remains constant, and no alteration of the pressure for inflation is intended. However, the inflated tube can keep the slide ring in place and can form a resilient radial support. But the kind of sealing is different from that of the present invention and no means of adjusting a clearance between sealing faces is proposed.

SUMMARY OF THE INVENTION

According to the present invention a shaft seal assembly for sealing a shaft extension emerging from a housing comprises a radial contact seal consisting of a plurality of segments which have circumferentially overlapping ends, said contact seal being disposed in an annular chamber of the housing, and at least one inflatable member surrounding the outer periphery of the overlapping of the contact seal in said annular chamber, and a supply system for a pressurised medium to inflate said inflatable member whereby the segments are constrained and radially forced against the rotating shaft or a bush mounted on the rotating shaft. The pressure of the pressurised medium is adjusted by suitable means to alter and set the force for constraining the segments. The inflatable member is disposed in said annular chamber in which it is supported by the housing which also supports the segments against axial displacement and against rotation. Radial movements of the segments are not prevented by the housing but are limited by the pressure inside said inflatable member.

As pressurized medium any liquid or gas can be used, and a constant pressure may be applied as long as the hydrostatic head of the medium to be sealed does not change. Means for automatically controlling the pressure of the pressurized medium in relation to changing pressure in the medium to be sealed may be installed.

It is within the scope of this invention to introduce a portion of the medium to be sealed directly into the cavity of said inflatable member thereby using the hydrostatic head of said medium for constraining the segments. If the assembly is a water seal of an aft-stern tube seal of a vessel sea-water can be used as pressurized medium, the pressure of which being the hydrostatic head of the sea-water actually surrounding the stern tube. However, additional means for increasing the pressure of the sea-water can be employed.

In a preferred embodiment particularly for an aft-stern tube seal of a sea-going vessel, a pressurised medium such as air or water is supplied from inside the vessel. In this case the pressure in the inflatable member can be controlled either corresponding to the static head of the outward sea-water or by the amount of sea-water ingressing through the radial contact seal.

The inflatable member can be an endless tube of rubber or a similar resilient material which is flexible and extensible. The inner periphery of the endless tube can be smaller in unextended state than the outer periphery of the contact seal so that the contact seal is constrained when the endless tube is mounted around the contact seal even if the tube is not inflated. It is also within the scope of the invention to compose the inflatable member of circumference segments of a tube, each segment being closed at its ends and being connected to a channel of a supply system for a pressurized medium.

BRIEF DESCRIPTION OF THE DRAWINGS

FIG. 4 is a longitudinal sectional diagrammatic view of one half of a shaft seal especially an aft-stern tube seal supporting a radial segmental contact seal and an inflatable member, and a passage for introducing a pressurized medium from an inboard supply system into the inflatable member and to an annular space forward of the contact seal.

FIG. 5 is a cross-sectional view of a preferred inflatable member.

FIG. 5a shows an inflatable member of different cross-section.

DESCRIPTION OF PREFERRED EMBODIMENTS

Figure 1:
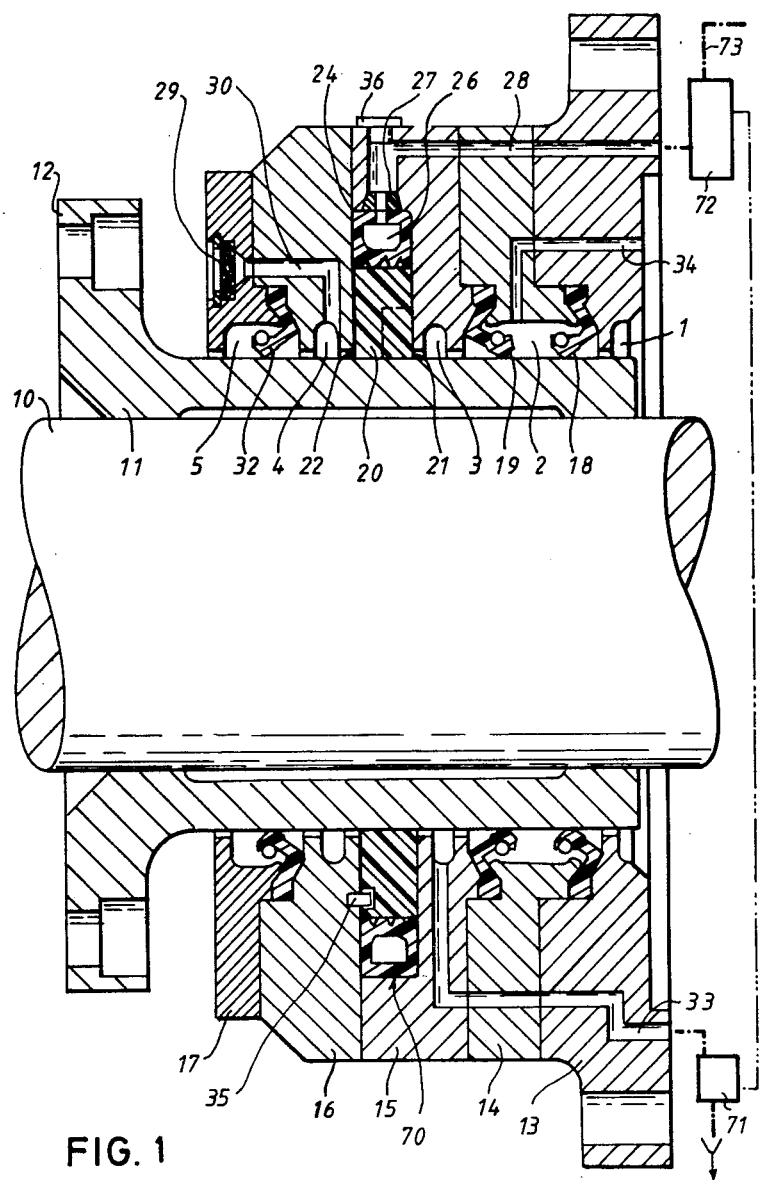
FIG. 1 is a longitudinal sectional diagrammatic view of a shaft seal assembly of an aft-stern tube sealing for a vessel, which assembly comprises a radial segmental contact seal and an inflatable member constraining the contact seal; a flow meter for registering any leakage flow and control means for adjusting the pressure inside the inflated member are also shown.

Referring to the drawings there is shown in FIGS. 1, 2, 3 and 4 the application of the invention in aft-stern tube seal assemblies. On the shaft 10 a bush 11 is fastened, which is provided with a flange 12, which is adapted to be attached to the propeller (not shown). The other end of the shaft extends into the stern tube bearing (not shown). The assembly is mounted by means of a fastening flange 13 onto a stern boss which is not shown. The housing of the assembly comprises the fastening flange 13 and a plurality of ring elements 14,15,16 and a cap 17 which elements are fastened by any suitable means to the fastening flange 13. In the housing there are sealing elements such as lip seals 18,19 and a radial contact seal 20 which is surrounded by an inflatable member 24. The segments of the contact seal 20 and the inflatable member 24 are enclosed in an annular chamber 70 formed between the ring elements 15 and 16 so that the segments are axially supported but can move radially.

In the embodiment according to FIG. 1, an annular space 4 is formed after contact seal 20 and communicates by a passage 30 and a filter 29 with the outboard sea-water. A lip seal 32 prevents sea-water containing dirt and abrasive particles from entering along the bush 11 from a space 5 into annular space 4. The hydrostatic head of the sea-water in the annular space 4 presses the forward or inner radial face 21 of the contact seal ring against a radial face of the ring element 15. By such construction a narrow gap (not shown) between the aft radial face 22 of the contact seal 20 and the ring element 16 is formed. In this narrow gap sea-water may enter and even penetrate in narrow spaces between the outer periphery of the contact seal 20 and the inflatable member without any disadvantage. The narrow gap allows radial motion of the segments in the annular chamber 70 between ring elements 15 and 16 including the contact seal and the inflatable member. Radial movements of the segments are necessary e.g. for adjusting a certain clearance between the inner periphery of the contact seal and the outer periphery of the bush, and further if wear occurs on the inner periphery of the contact seal and if the shaft is subjected to radial displacements or radial vibrations. A locking pin 35 prevents the contact seal from rotation.

Forward of the contact seal 20 there is a void annular space 3 which is drained by a drain pipe 33 leading to the bilge inside the vessel (not shown). At any suitable place in the drain pipe 33 a flow meter 71 is arranged monitoring the amount of leakage sea-water entering into the void space 3 and transmitting signals to control means 72 which comprise valves (not shown) for increasing and reducing the pressure of the pressurized medium for inflating the inflatable member. The pressurized medium is taken e.g. from a constant pressure gas or liquid supply system 73°, the pressure of the medium is adjusted in the control means 72 and the medium is introduced through a passage 28 and a connecting part 27 into the cavity 26 of the inflatable member 24. The whole sealing system including the segmental contact seal 20 and the inflatable member 24 aims at circumferentially compressing all segments uniformly against the bush by a compressive force which is strong and just as effective to seal but not so strong as to cause wear of the sealing peripherical faces, and this is achieved by maintaining a small constant flow of sea-water leaking into void space 3, which flow is sufficient to lubricate the facing sealing peripheries and which is independent from the hydrostatic head of the outboard sea-water and unaffected by radial displacements and vibrations of the shaft.

Forward of the void annular space 3 a further annular space 2 is formed between the lip seals 18 and 19. This annular space 2 contains a liquid medium such as oil for lubricating and cooling the lip seals. The liquid medium is introduced into annular space 2 through a passage 34 from inside the vessel. Forward of the annular space 2 there is another annular space 1 communicating with the stern tube and containing oil lubricating the stern tube bearing. The hydrostatic head of the liquid medium in the annular space 2 may be higher than that of the oil in the stern tube and therefore the lips of the lip seals 18, 19 are directed towards one another.

A screw plug 36 is provided in ring element 15 to close a borehole which allows admittance to the connecting part 27 on the inflatable member 24, so that at the time of mounting the seal assembly the inflatable member 24 can be directly connected to a vacuum or pressure source.

In the further drawings, the parts of the seal assembly are essentially the same as described, before and in general, similar reference numbers are used.

Figure 2:
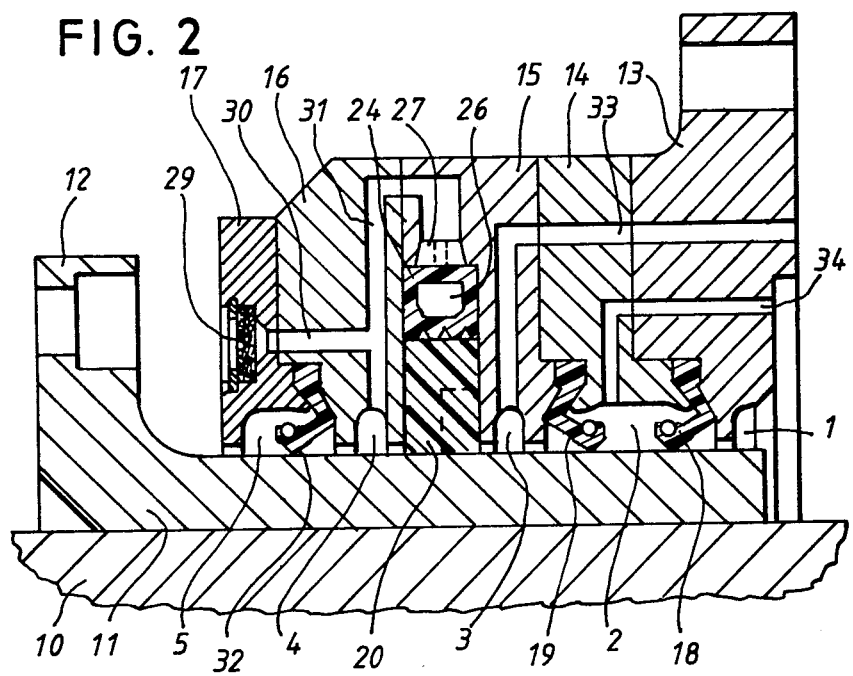
FIG. 2 is a longitudinal sectional diagrammatic view of one half of a shaft sealing assembly comprising a radial segmental contact seal and an inflatable member constraining the contact seal, and a passage for introducing the medium to be sealed as pressurized medium into the inflated member.

In the embodiment according to FIG. 2 sea-water entering through filter 29 and passage 30 communicates directly through a passage 31 with the cavity 26 of the inflatable member 24, and no other system for supplying a pressurized medium is provided. In this arrangement, the segments of the contact seal 20 are constrained by the hydrostatic head of the outboard sea-water surrounding the seal assembly. Whenever the depth of immersion changes, the pressure inside the inflatable member 24 is altered suitably which will result in an almost constant leakage flow independent from the outboard pressure. In this embodiment an inflatable member 24 in form of an endless ring-shaped tube is preferred which can keep the segments of the contact seal 20 together even in the event when there is no sea-water in the cavity 26 which case may occasionally happen e.g. when the vessel is in a dry dock.

Figure 3:
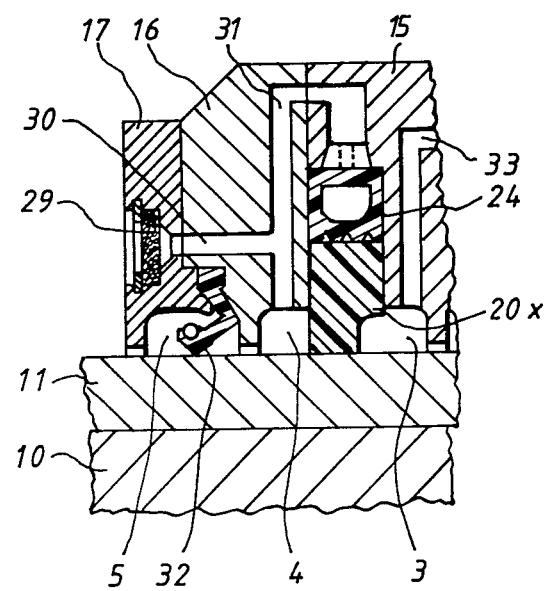
FIG. 3 is a partial view as in FIG. 2 but with a different cross-section of the radial segmental contact seal ring.

The embodiment according to FIG. 3 is similar to that of FIG. 2, that the inflatable member 24 is inflated by the sea-water, however, the segmental contact seal ring 20x has a different cross-section in which the inner peripheral face is smaller than the outer side to increase the effective pressure of the contact seal for reducing the clearance. Other dimensional relations between inner periphery of the contact seal and its outer periphery, and the dimensions of the inflatable member are possible and are within the scope of the invention.

In the embodiment shown in FIG. 4, the inflatable member 24 is inflated by a pressurized liquid such as purified sea-water supplied from inside the vessel through passage 28. The liquid is also introduced through a conduit 28a into an annular space 3a forward of the contact seal 20. The hydrostatic head in space 3a is higher than that of the outboard sea-water, and from space 3a some liquid will leak past the contact seal into spaces 4 and 3 thereby flushing away any dirt. In this embodiment the radial aft side of the contact seal 20 is axially pressed against a radial face of ring element 16. Lip seal 19a faces outboard and the pressure in annular space 2a is lower than that in space 3a. Lip seal 18a faces inboard especially if the oil pressure in space 1 of the stern tube is higher than that in space 2a. The media for inflating the inflatable member 24 and for lubricating the contacting peripherical faces of contact seal 20 and bush 11 and the pressure of these media may be chosen as desired, and, suitable supply systems and passages are used.

In FIG. 5 a cross-section of a preferred inflatable member 26 is shown. It comprises a cavity 24. The inner peripherical side is provided with ribs 25 for contacting the outer periphery of the contact seal. The inflatable member 24 is made from a resilient material such as rubber or rubber-like plastics. The ribs are deformable so that they can compensate for small radial vibration of the contact seal caused by vibrations of the propeller shaft. In FIG. 5a the inner surface of the inflatable member 24a and the outer periphery 23a of a contact seal 20y are both conical thereby forcing the contact seal 20y axially against a radial face of a ring element.

Figure 6:
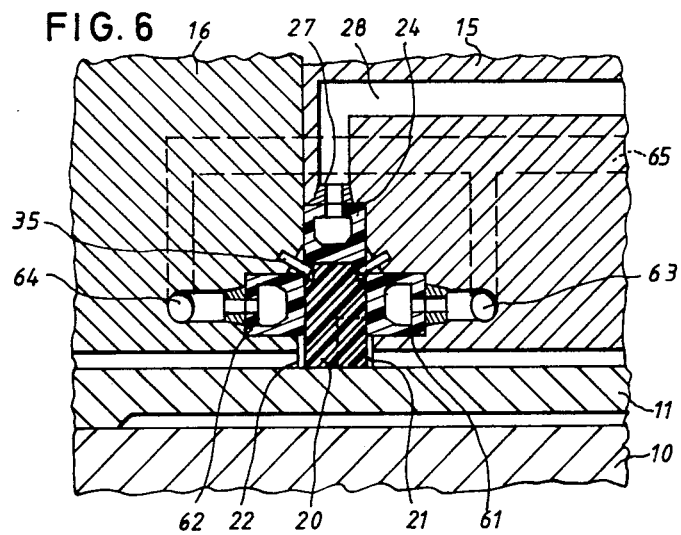
FIG. 6 is a longitudinal sectional diagrammatic view of a part of a shaft seal assembly comprising a radial segmental contact seal and an inflatable member radially constraining the contact seal and two further inflatable members on both the radial sides of the contact seal for axially supporting the contact seal.
Figure 7:
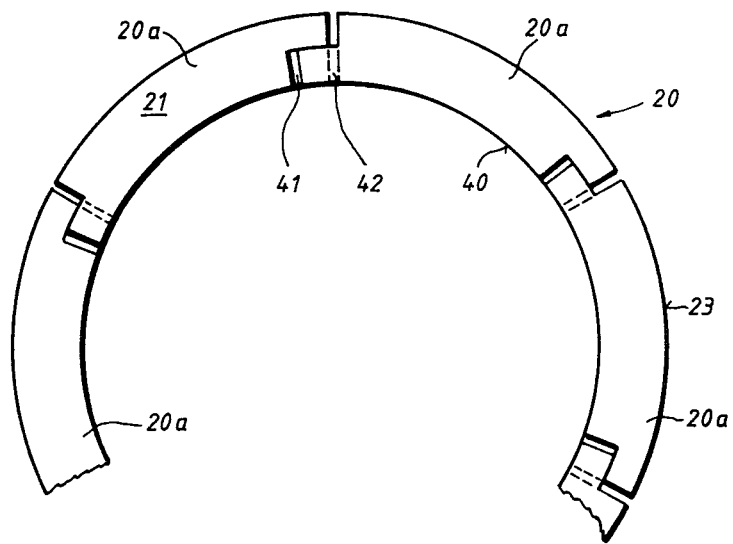
FIG. 7 shows segments of the segmental contact seal and illustrate an example for the overlapping ends of the segments.

FIG. 6 shows a radial contact seal 20 constrained by an inflatable member 24 as described before. Additional inflatable members 61 and 62 are disposed axially on both the radial sides 21, 22 of the contact seal 20 for a resilient axial support which accommodates tilting movements of the propeller shaft and the contact seal relative to the housing. A separate pressurized medium may be introduced through conduits 63,64,65 into the inflatable members 61 and 62. A flexible axial support by at least one axially inflatable member 61,62 may be used in any of the embodiments according to FIGS. 1, 2, 3 or 4. FIG. 7 is an axial view on the radial face 21 of a part of the radial contact seal 20 illustrating how it is composed of segments 20a with overlapping ends. The inner periphery 40 of the seal is directed against the shaft or the bush, and the outer periphery 23 is to be surrounded by the inflatable member. At one end each segment has an area 41 of reduced thickness and at the other end a tongue 42 projecting into the area of reduced thickness of the adjacent segment. The radial edges of adjacent segments normally do not touch each other in mounted position so that they can be drawn together. Any convenient number of segments may be used even though FIG. 7 shows an example of an contact seal comprising six segments. The contact seal segments are made from corrosion-resistant rigid materials such as graphite, bronze, synthetic resins or combinations of these and similar materials.

What is claimed is:

1. A shaft seal assembly for sealing a shaft emerging from a housing, the assembly comprising:
   a shaft around which the seal assembly is applied,
   radial-contact seal disposed concentric with the shaft and consisting of a plurality of segments which have circumferentially overlapping ends,
   said contact seal being disposed coaxially with the shaft within an annular chamber of said housing, the seal assembly including means for nonrotatably and axially supporting the contact seal within said housing,
   at least one inflatable member inserted in said annular chamber, to peripherally contact said contact seal,
   conduit means connecting said inflatable member to a supply system of an adjustable pressurized medium for inflating said inflatable member,
   whereby in use the contact seal segments are radially constrained and forced against the shaft by the pressure of the pressurized medium in said inflatable member in inflated condition.

2. A shaft seal assembly as in claim 1 wherein said inflatable member includes elastically deformable ribs extending circumferentially on its inner surface contacting an outer peripheral surface of the contact seal.

3. A shaft seal assembly as in claim 1 in which said inflatable member surrounding the contact seal is substantially in the form of endless tube.

4. A shaft seal assembly as in claim 3 in which the inner periphery of the endless tube is smaller in an uninflated state than an outer periphery of the contact seal so that the segments of the contact seal are constrained by mounting the endless tube around the contact seal.

5. A shaft seal assembly as in claim 1 in which said inflatable member is composed of a plurality of segmental pieces of a tube, each piece being closed at its ends and connected to a supply system for a pressurized medium, and the ends of the segmental pieces substantially touching each other.

6. A shaft seal assembly as in claim 1 further comprising at least one other axially inflatable member positioned between a radial face of the contact seal and a radial face of said annular chamber, said axially inflatable member being connected by a conduit to a pressurized medium.

7. A shaft sealing assembly as in claim 1 in which the pressure of the pressurized medium inside said inflatable member is generated by a liquid medium to be sealed.

8. A shaft sealing assembly as in claim 7 in which the inside of said inflatable member is connected by a conduit with the space containing the liquid medium to be sealed, whereby the liquid medium to be sealed can inflate said inflatable member and constrain the segments of the contact seal.

9. A shaft sealing assembly as in claim 8 further comprising: a drained space at the side of the contact seal which is opposite to the medium to be sealed; a flow meter for detecting any leakage of the medium to be sealed through said contact seal, said flow meter being inserted in a drain pipe leading out of the drained space; control means including a pressure regulating valve in a conduit for supplying the pressurized medium to said inflatable member, said control means being adapted to be influenced by said flow meter to alter the pressure of the pressurized medium inside said inflatable member whenever the leakage of the medium to be sealed deviates from a predetermined small amount.

10. A shaft seal assembly for sealing a propeller shaft of sea-going vessels, the shaft emerging from a housing attached to the aft end of the stern tube, the assembly comprising: a bush mounted on the propeller shaft; an annular radial-contact seal as an outboard water seal consisting of a plurality of circumferential segments which have circumferentially overlapping ends, said contact seal being disposed coaxially with the propeller shaft within an annular chamber of said housing and being nonrotatably and axially supported within said housing, said contact seal being surrounded by at least one peripheral inflatable member inserted in said annular chamber, said inflatable member being connected by conduit means to a supply system of a variably pressurized medium for inflating said inflatable member, whereby in use the segments are radially constrained and forced against the bush by an actually present pressure of the pressurized medium in said inflatable member, the assembly further including a void annular leakage space near said annular chamber and positioned in an inboard direction of it, said leakage space being connected to a drain pipe, the assembly including a further annular chamber adjacent to and separated from said annular leakage space by an inboard facing lip seal bearing on the bush, said further annular space communicating with a lubricant supply system.

11. A shaft seal assembly as in claim 10 further comprising a flow meter connected to the drain pipe on said annular leakage space, and control means comprising a pressure regulating valve in a conduit for supplying the pressurized medium to the inflatable member, the control means being adjustable to vary the clearence between the contact seal and the bush by altering the pressure inside said inflatable member to maintain a constant low flow of penetrating sea-water.

12. A shaft seal assembly for sealing a propeller shaft of a sea-going vessel, the shaft emerging from a housing attached to the aft end of the stern tube, the assembly comprising: a bush joined to the propeller shaft; a radial-contact seal as an outboard water seal consisting of a plurality of circumferential segments which have circumferentially overlapping ends, said contact seal being disposed coaxially with the propeller shaft within an annular chamber of said housing and being nonrotatably and axially supported with said housing, said contact seal being surrounded by at least one annular inflatable member inserted in said annular chamber; conduit means connecting said inflatable member to a supply system of a pressurized medium for inflating said inflatable member; an annular space at an inboard side of the contact seal and means for pumping water in said annular space at a pressure higher than the sea-water pressure to lubricate the contact seal and to flush away any dirt in an outboard direction, and a further annular space forward of said first annular space and separated from it by an outboard facing lip seal and means for supplying a liquid medium at a pressure lower than the pressure into said first annular space.

* * * * *